United States Patent [19]
Lukaszewski

[11] Patent Number: 5,136,749
[45] Date of Patent: Aug. 11, 1992

[54] GLASS WIPER BLADE OF GREAT SUPPLENESS, PARTICULARLY FOR VERY CURVED WINDOWS OF AUTOMOTIVE VEHICLES

[76] Inventor: Andre Lukaszewski, 32, Rue de Avets, 25700 Mathay, France

[21] Appl. No.: 655,784

[22] Filed: Feb. 15, 1991

[30] Foreign Application Priority Data

Feb. 15, 1990 [FR] France .................. 90 01839

[51] Int. Cl.$^5$ .............................. B60S 1/04
[52] U.S. Cl. .................. 15/250.42; 15/250.31
[58] Field of Search .......... 15/250.42, 250.35, 250.31, 15/250.41, 250.38, 250 A, 250 B, 250.36, 250.37, 250.39, 250.40

[56] References Cited

U.S. PATENT DOCUMENTS

| | | | |
|---|---|---|---|
| 2,888,702 | 6/1959 | Sussex | 15/250.42 |
| 3,916,474 | 11/1975 | Kohler | 15/250.42 |
| 4,095,308 | 6/1978 | Bloiklock et al. | 15/250.42 |

Primary Examiner—Harvey C. Hornsby
Assistant Examiner—Gary Graham
Attorney, Agent, or Firm—Wong & Husar

[57] ABSTRACT

The invention relates to a glass wiper blade having great suppleness and flexibility, particularly for very curved windows of vehicles such as automobiles. A secondary or intermediate yoke of a support assembly for the blade is provided with first and second sections that are pivoted to each other. The first section if pivoted to a supporting yoke and biased by an elastic means such that the blade can follow a window surface, even if extremely curved.

14 Claims, 3 Drawing Sheets

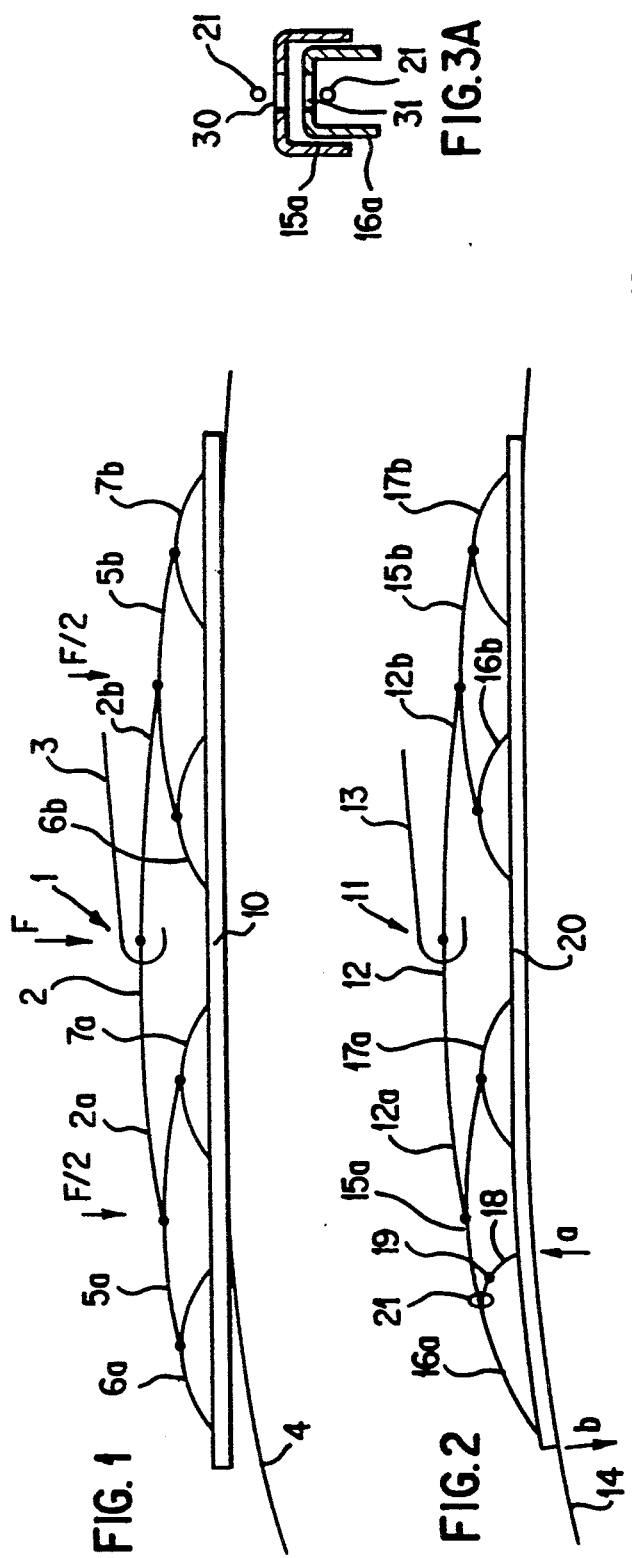
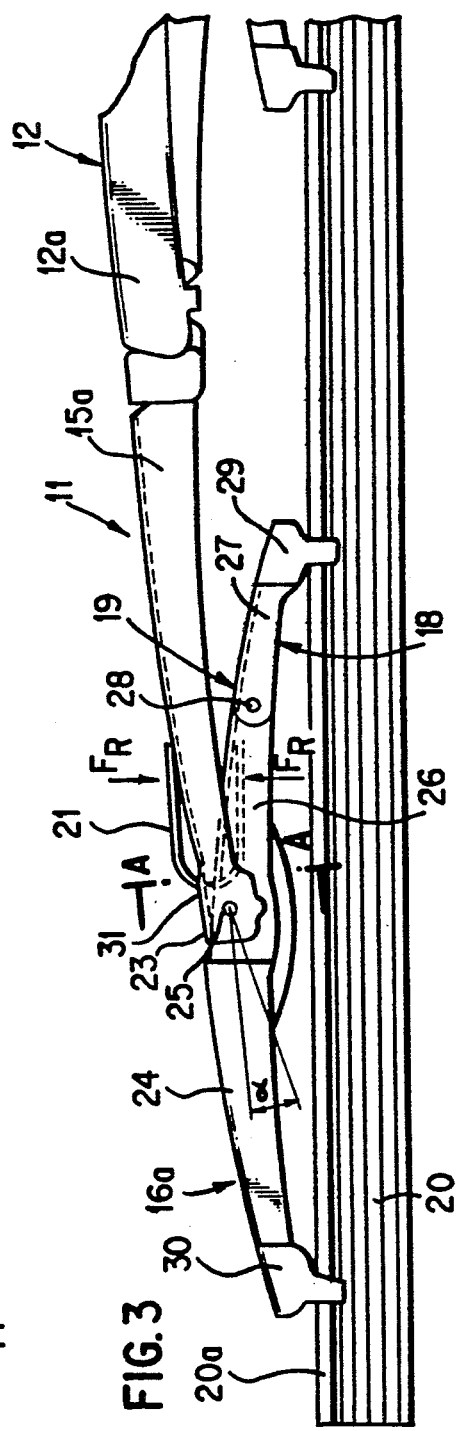
FIG. 1
FIG. 2
FIG. 3
FIG. 3A

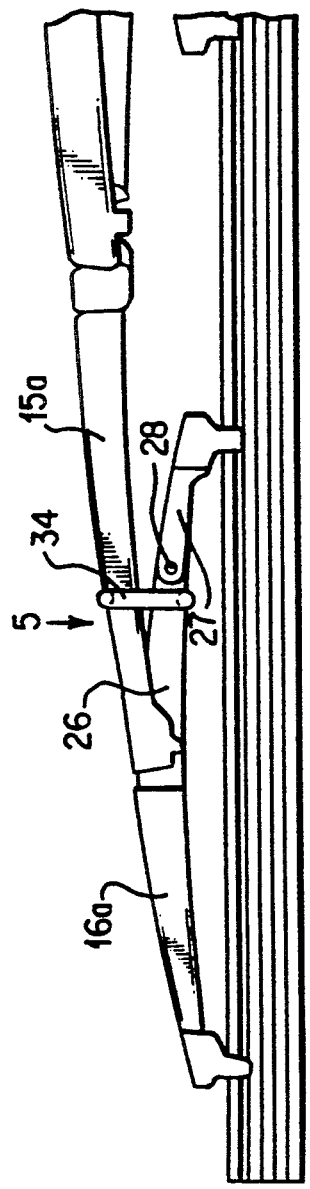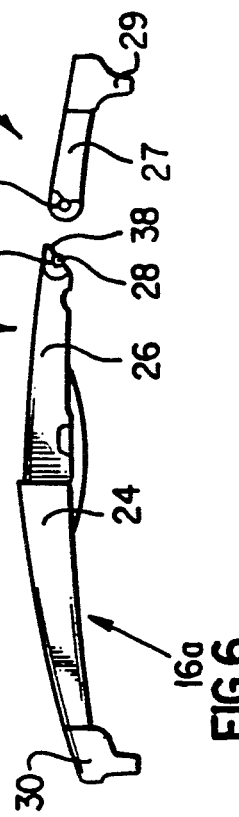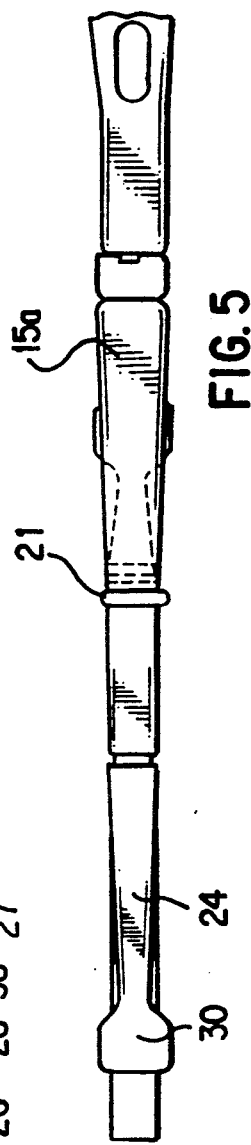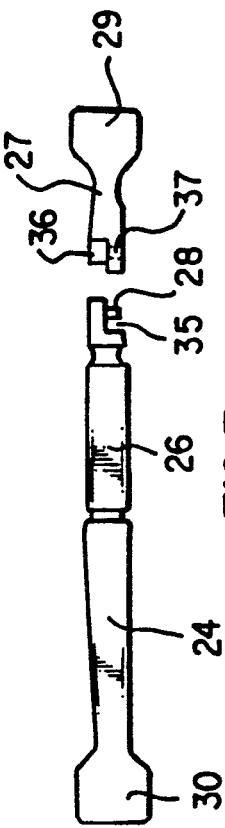

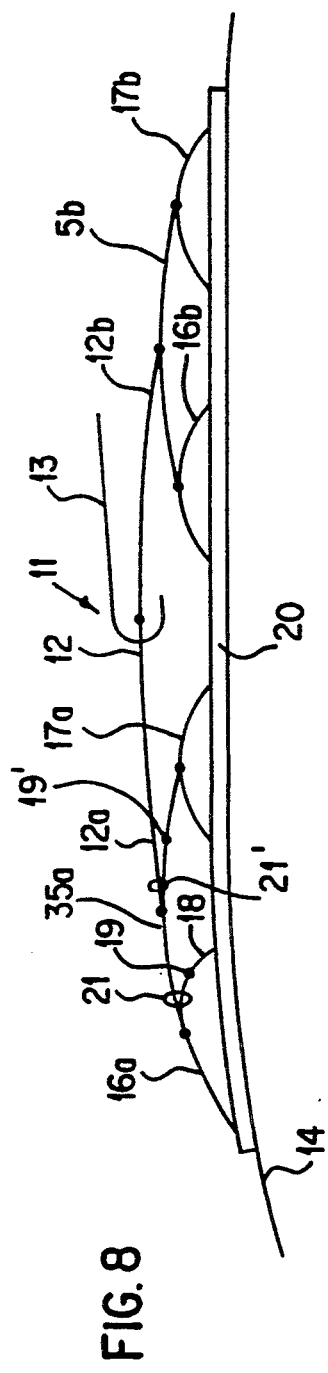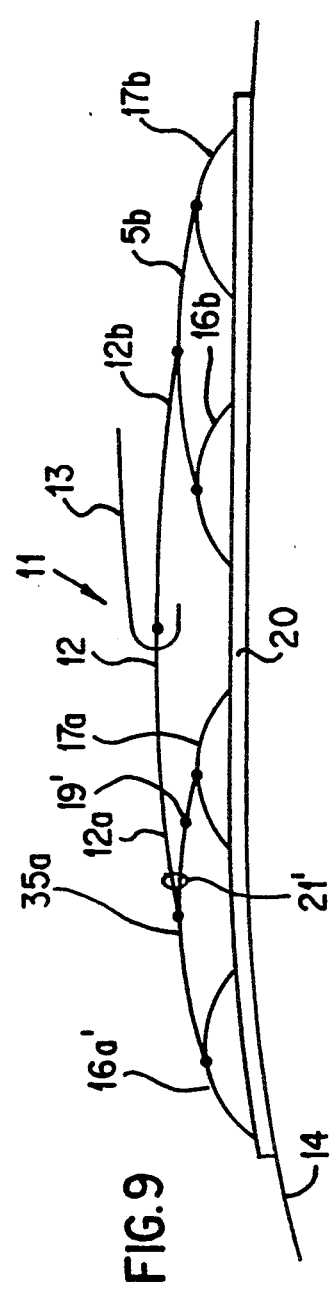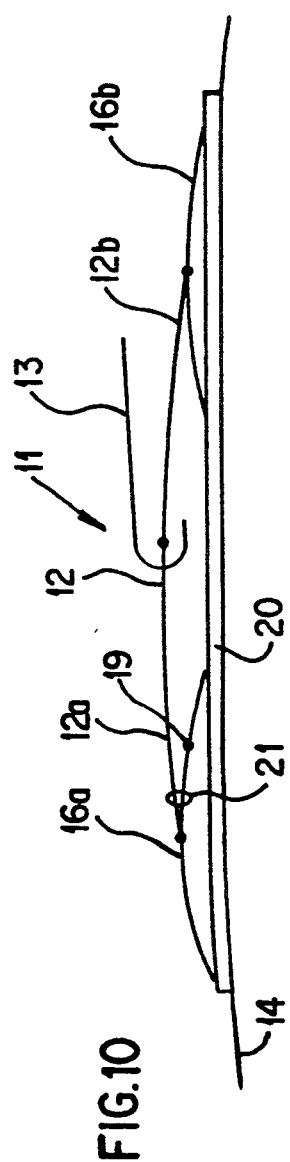

GLASS WIPER BLADE OF GREAT SUPPLENESS, PARTICULARLY FOR VERY CURVED WINDOWS OF AUTOMOTIVE VEHICLES

This invention relates to a glass wiper blade having great suppleness and flexibility, particularly for very curved windows of vehicles such as automobiles.

BACKGROUND OF THE INVENTION

Automotive vehicles have, associated with their windshield and often their rear window, glass wipers including two blades connected to a drive mechanism for alternate turning motion.

The wiping or squeegee portion includes a flexible wiping blade usually of rubber having an edge encased in a flexible metal strip and a support assembly for the blade connected to the drive mechanism for alternately turning the wiper.

The support assembly usually comprises a principle or main yoke having means for attaching to a wiper arm by means of which the wiper can be driven, and yokes pivotally connected directly or indirectly to the main yoke.

Usually, the main yoke pivotally supports an intermediate yoke at an end of each of its branches, and each intermediate yoke pivotally supports a secondary yoke at the end of each of its branches.

In this case the flexible blade or wiper strip is attached to the ends of the secondary yokes.

The main yoke is a carrier yoke which transmits the force that presses the wiper against the glass. The intermediate yokes are at the same time, support yokes and carrier yokes on which the secondary yokes are mounted.

In the case of automotive vehicle windows such as windshields or rear windows which are very curved, it is necessary to use a wiper blade of great suppleness capable of assuming the contour of the glass whatever may be the position of the wiper blade relative to the curved surface, under the effect of the pressure force transmitted by the wiper arm.

The use of a blade wiper of great suppleness and the pivotal mounting of the supporting yokes on the carrier yokes usually permits avoiding the separation of the supple wiper relative to the glass which occurs with a defective wiper.

However, in the case of very curved windows, a portion of the outer extremity of the wiping blade can be found to be raised relative to the surface of the glass in certain positions of the blade during use.

In addition, the wiping devices for windows of automotive vehicles can be equipped with a stop positioning system called stop-parking which allows the protection of the wiper blades and prohibits removal when the blades are in a rest position, particularly when the vehicle is standing. The principle of operation of stop-parking is the following: by increasing the angle of sweep of the blades, the system for stop-parking positioning of the wiper blades permits the blades to be placed under the hood of the motor. This displacement in the stop-park position can be accompanied by a relaxing of the pressure force of the blades on the window, due to ramps or abutments assuring a predetermined lifting of the blades or a relaxing of the pressure force exerted by the wiper arms.

The outer end of the blade is then found to be lifted with respect to the surface of the glass such that on return of the blade to the active position, contact of the end of the blade with the glass is not very certain.

SUMMARY OF THE INVENTION

An object of the invention is thus to provide a window glass wiper including a supple wiping blade or squeegee and a support assembly for the blade including a main yoke having means for connection to a wiper arm and having two branches or arms each pivotally supporting an intermediate yoke, each intermediate yoke pivotally supporting a secondary yoke on each of its branches or arms and the supple blade being connected to the secondary yokes. This glass wiper blade is very effective for usual glass, very curved glass, and arrangements of glass wipers having a system of stop-parking. This wiper is of a simple construction permitting manufacture according to known methods, as in the case of the glass wiper blades according to the prior art.

For this object, at least one of the support yokes (secondary or intermediate) has a branch or arm constituted of two sections connected by a supplementary pivot, situated opposite to one branch of the corresponding carrier yoke (intermediary or main), on which the support yoke is mounted, one of the sections on which is located the means for connecting the support yoke to the carrier yoke being biased by elastic means in the direction of the branch of the carrier yoke on which this support yoke is mounted. Stated differently, the elastic means pivots the two section arm in a direction toward the body of its carrier yoke.

In order to better comprehend the invention, there is described, a non-limiting example with reference to the accompanying drawings of plural embodiments of a glass wiper blade for automotive vehicles, according to the invention.

BRIEF DESCRIPTION OF DRAWINGS

FIG. 1 is a schematic view of a windshield wiper blade according to the prior art shown pressing on the surface of the windshield of a vehicle;

FIG. 2 is a view like FIG. 1 but showing one embodiment of the windshield wiper blade according to the invention pressing on the surface of the windshield;

FIG. 3 is an enlarged partial view in greater detail of the outer end portion of the windshield wiper blade according to the invention of FIG. 2;

FIG. 3A is a view in section taken along line A—A of FIG. 3;

FIG. 4 is a view like FIG. 3, of a variation of a windshield wiper blade according to the invention;

FIG. 5 is a top plan view looking along line 5 of FIG. 4;

FIG. 6 is a side view of a secondary yoke of a wiper blade according to the invention whose branch comprises two sections shown in the unassembled state;

FIG. 7 is a top view looking along line 7 of FIG. 6.

FIG. 8 is a view like FIG. 2 but shows a variation of the wiper blade of FIG. 2;

FIG. 9 is a view like FIG. 2 but shows another embodiment of wiper blade according to the invention; and FIG. 10 is a view like FIG. 2 but shows a further embodiment of a wiper blade according to the invention.

DETAILED DESCRIPTION

FIG. 1 shows a windshield wiper 1 according to the prior art.

This windshield wiper has a main or carrier yoke 2 connected at its center to a wiper arm 3 for driving the blade 1 over the surface of the glass 4 of a curved windshield. The main yoke 2 has a first branch 2a, and a second branch 2b on opposite sides of its center.

An intermediate yoke is pivotally connected to the free end of each of the branches of the main yoke i.e. an intermediate yoke 5a is pivotally connected to the end of branch 2a, and an intermediate yoke 5b is pivotally connected to the end of branch 2b.

A secondary yoke is pivotally connected to the free ends of the branches of each of the intermediate yokes i.e. secondary yokes 6a and 7a are pivotally connected respectively to the ends of the branches of intermediate yoke 5a, and secondary yokes 6b and 7b are pivotally connected respectively to the ends of the branches of intermediate yoke 5b.

A pressing force F essentially perpendicular to the surface 4 of the windshield is applied to the main yoke by the wiper arm 3.

This pressing force F is transmitted as two forces F/2 to the intermediate yokes 5a, 5b, at the ends of the branches 2a and 2b of the main yoke.

The forces F/2 are distributed between the two secondary yokes such as 6a and 7a, or 6b and 7b.

A supple blade 10, usually a strip of rubber having an edge encased in a flexible metal strip, is fixed to the connector ends of the secondary yokes which are the means for connecting the support assembly comprised of the main yokes, intermediate yokes, and secondary yokes to the blade 10.

Despite the pressure force F/2 on the intermediate yoke 5a, in the case of a curved windshield as shown as FIG. 1, the outer end of the blade 10 is liable to not come into contact with the curved surface of the windshield. Wiping of the glass is then imperfect, on the curved portions of the glass toward the outside.

Similarly, if the pressure force exerted by the wiper arm is relaxed as in a system of stop-parking, the outer end of the wiper blade is liable to raise above the curved surface of the windshield.

FIG. 2 schematically shows a glass wiper blade assembly 11 according to the invention which overcomes the disadvantages of the glass wiper blades of the prior art, such as the one shown at FIG. 1.

The glass wiper blade generally designated 11 has a main or carrier yoke 12 connected to a wiper arm 13 for displacing or sweeping the blade across the surface of the glass of a curved windshield 14. The main yoke 12 has a first branch 12a, and a second branch 12b on opposite sides of its center. An intermediate yoke 15a is pivotally connected to the end of branch 12a, and an intermediate yoke 15b is pivotally connected to the end of branch 12b. A secondary yoke is pivotally connected to the free ends of the branches of each of the intermediate yokes i.e. secondary yokes 16a and 17a are pivotally connected respectively to the ends of the branches of intermediate yoke 15a, and secondary yokes 16b and 17b are pivotally connected respectively to the ends of the branches of intermediate yoke 15b.

A supple blade 20 in the form of a strip of rubber having an edge encased in a flexible or resilient metal strip, is connected to the connector ends of the secondary yokes 16a, 17a, 16b, and 17b.

According to the invention at least one of the secondary yokes such as 16a has a branch 18 with a supplementary pivot 19, the branch 18 being situated straight below and in the plane of the branch of the intermediate yoke 15a on the end of which the secondary yoke 16a is pivotally mounted.

The secondary yoke 16a whose branch 18 is constructed to pivot is located at that end of the wiper blade which contacts the very curved portion of the windshield 14.

The branch 18 of the secondary yoke 16a has two sections, on opposite sides of the pivot 19. One of these sections is rigid with the second branch of the yoke and is pivotally connected to the intermediate yoke 15a. This section of the branch 18 is urged by elastic means 21 in the direction of the branch of the intermediate yoke 15a which pivotally supports the secondary yoke 16a i.e. anti-clockwise as viewed at FIG. 2.

FIG. 3 shows in more detail, on an enlarged scale, an end portion of a windshield wiper blade assembly 11 of FIG. 2, according to the invention. Corresponding elements of FIGS. 2 and 3 are identified with the same reference numerals.

The secondary yoke 16a is connected to the end of the branch of the intermediate yoke 15a which extends outwardly. This end of the branch of the intermediate yoke 15a is constituted by a fitting 23 in the form of a U-shaped cap or hood in which is engaged the center part of the secondary yoke 16a located between the pivoted branch 18 and a rigid branch 24 which extends outwardly.

The secondary yoke 16a in the fitting 23 is connected to the fitting by a pivot axle 25.

The branch 18 of the secondary yoke 16a has a first section 26 rigid and integral with the branch 24 of this yoke at the region of the pivot axle 25, and a second section 27 pivoted at a pivot 28 on the second end of the section 26, which is to one side of the pivot axle 25.

The second section 27 of the branch 18 has a claw 29 at its end for connection to a flexible metal strip 20a secured along an edge of the supple rubber blade 20.

In a similar manner, the outer end of the second or rigid branch 24 of the yoke 16a has a claw 30 at the level of which the supple blade 20 is connected to the branch 24 by the metal strip 20a. The claws 29 and 30 allow the metal strip 20a to move longitudinally relative to the claws, but provide a relatively rigid connection to the metal strip in a transverse direction.

The branch 18 of the yoke 16a which has two pivoted sections 26 and 27 is straight below the branch of the intermediate yoke 15a at the end of which the secondary yoke 16a is connected by the pivot 25.

The means to urge the section 26 of the pivot branch 18 in a direction toward the intermediate yoke 15a which supports the secondary yoke 16a is a spring 21 in the shape of a U or hairpin having two legs and extending through openings 30 and 31 which respectively traverse the wall of the intermediate yoke 15a and the wall of the secondary yoke 16a, as shown at FIGS. 3 and 3A.

One of the legs of the spring 21 presses on the outer surface of the wall of the intermediate yoke 15a and the other leg of the spring 21 presses against the inner surface of the wall of the secondary yoke 16a. In this manner, the section 26 of yoke 16a rigid with the branch 24 is urged in a direction toward the branch of the intermediate yoke 15a on which the secondary yoke 16a is pivoted (anti-clockwise as shown at FIG. 3).

The arrows FR at FIG. 3 show the force FR exerted by the spring 21 between the intermediate yoke 15a and the section 26 of the branch 18 of the secondary yoke 16a.

This force FR exerted by the spring 21 and the presence of the pivot 28 permits increasing the pivotal deflection of the secondary yoke 16a when the outer end portion of the wiper assembly is directly over a curved portion of the windshield, as shown at FIG. 2.

In essence, the intermediate yoke 15a exerts a pressing force on the secondary yoke in the direction of the surface of the glass, in the case where the outer portion of the supple blade is above the curved portion of the windshield, to cause the section 26 of the branch 18 of the secondary yoke 16a to turn through an angle (alpha) about the pivot 25 due to the presence of the pivot 28 and the spring 21.

This rotation of the portion of the secondary yoke 16a permits displacing the claw 30 and the corresponding portion of the supple blade 20 in such a manner that the blade remains in contact with the curved portion of the windshield, at the extremity of the wiper 11.

As shown by the arrows a and b at FIG. 2, the end of the secondary yoke 16a having the claw 29 and the corresponding portion of the supple blade 20 can displace away from the surface of the windshield 14 while the end of the yoke 16a having the claw 30 and the corresponding portion of the supple blade 20 can displace in the direction of the windshield 14, until it comes to press on the outer surface, in a manner to conform to the curved portion, when the wiper blade or arm is at rest, with the outer end of the face of a curved region of the windshield.

The application of pressure to the supple blade 20 of the wiper along its entire length is thus assured by the force F/2 exerted by the intermediate yoke 15a and by the force FR of the spring 21 because of the presence of the pivot 28.

When the wiper blade, during operation, is displaced over a surface, from a very curved region to a region where the curve is much less or is flat, the wiper blade follows these surface changes.

If one designates by FPL the force produced by the rigidity and the deflection imposed on the metal strip 20a which constitutes the support strip of the wiper supporting the supple blade 20, it is necessary to make the wiper blade and the wiper arm in such a manner that the outer secondary yoke and the supple blade are forced to conform to the curve of the glass and return to their original form all while obtaining sufficient constant contact with the surface of the glass to obtain good wiping.

These conditions are realized where the following inequalities are respected:

$$F/2 > FR > FPL.$$

In this case, the pressing force of the intermediate yoke can be assured by applying it to one portion of the plane of the wiper in opposition to the spring 21, and the spring 21 is able to cause swinging through an angle (alpha) of the secondary yoke 16a in a manner to press the supple blade against the curved portion of the windshield.

On a plane or slightly curved surface, application of the force F/2 by the intermediate yoke permits the secondary yoke 16a and the souple blade 20 to return to their initial shape.

FIGS. 4 and 5 show a variation of the embodiment of the glass wiper blade of FIG. 3.

Corresponding elements of FIG. 3 and FIGS. 4 and 5 are identified by the same reference numerals.

The wiper shown at FIGS. 4 and 5 is essentially identical to the wiper shown at FIG. 3, except that the spring 21 is replaced by a band or ring 34 of rubber or a similar elastic which extends around and pulls section 26 toward the intermediate yoke 15a.

The operation of the wiper of FIGS. 4 and 5 is the same as that of FIG. 3.

FIGS. 6 and 7 show a secondary yoke 16a which can constitute the secondary yoke of a glass wiper blade such as the ones of FIGS. 3 to 5. The yoke 16a is made of two parts and is shown unassembled in FIGS. 6 and 7.

A first part of the yoke 16a is constituted by a branch 24 of the yoke and section 26 of the branch 18 allowing the secondary yoke to be pivotally connected to the end of a branch of an intermediate yoke such as the yoke 15a of FIGS. 3 to 5.

A second part of the secondary yoke 16a is constituted by the section 27 of the branch 18 which has the claw 29 at its end.

The end of the section 26 is machined or otherwise shaped to form a part circular notch 35 and a pivot axle 28.

The portion of the mating end of the section 27 is machined to provide a notch having a stop surface 36 and an opening 37. The end portion of the section 26 has a stop surface 38 so positioned that when the sections 26 and 27 are assembled by engaging axle 28 in the opening 37, the stop surface 38 is opposed to and can engage the stop surface 36.

Thus, the application of a force directly toward the surface of the glass by the intermediate yoke 15a (FIGS. 3 and 4) having as its origin the force F/2 transmitted by the main yoke limits, by the interaction of the surfaces 38 and 36, the deflection of the claws 29 and 30 about the pivot 19 in a direction away from the surface of the glass in the case where the outer end of the blade is on a region of the glass which is plane or only slightly curved. The yoke 16a at the end of the supple blade 20 can thus resume the shape corresponding to a position of the sections 26 and 27 in which the claws 29 and 30 are in a common plane.

The wiper blade of the invention can also have an intermediate yoke with a pivot in one of its branches as shown at FIG. 8. FIG. 8 is the same as FIG. 2 except that an intermediate yoke 35a is used instead of the intermediate yoke 15a of FIG. 2. Intermediate yoke 35a has a first branch composed of two sections connected together by a pivot 19'. One of these sections is rigid with the second branch of the yoke and is pivotally connected to the branch 12a of the main yoke. This section of yoke 35a is urged by elastic means 21' in the direction of the branch 12a of the main yoke 12 which pivotally supports this intermediate yoke 35a, i.e. anti-clockwise as viewed at FIG. 8.

FIG. 9 shows an embodiment in which a secondary yoke 16a' is used which is unitary and does not have the pivot 19 or elastic means 21. The intermediate yoke 35a is used which has the pivot 19' and the elastic means 21' for urging this intermediate yoke anti-clockwise about the pivot connection to the branch 12a of main yoke 12.

FIG. 10 shows an embodiment in which the secondary yokes 16a and 16b are pivotally connected directly to the ends of the branches 12a and 12b of the main yoke 12. Pivot means 19 are provided in one branch of the secondary yoke 16a, and elastic means 21 are provided to urged the branch with the pivot toward the branch 12a of the main yoke, i.e. anti-clockwise as viewed in FIG. 10.

In the embodiments of FIGS. 8 to 10 the pivots 19 and 19' can have the same structure as the pivot connection shown at FIGS. 6 and 7. In the case of the intermediate yoke with a pivot 19', the end structure of the branches will be for pivotal connection to the secondary.

The wiper blade according to the invention thus assures a perfect contact of the supple blade of the wiper with the glass, as well in the case where the blade is at rest and has a portion, for example its outer portion, opposed to a very curved region of the glass such as the case where the blade is in operation and used to wipe a surface of glass having very curved regions and slightly curved or plane regions.

These results are obtained without changing the height of the blade and the number of connecting claws for the supple blade. The use of the wiper blade according to the invention does not require increasing the power of the drive motor of the of the glass wiper or modifying the drive system of the wipers.

The manufacture of the glass wiper blade of the invention does not require substantial changes in the tools or methods used for manufacturing the glass wipers of the prior art.

Similarly, the glass wiper blade of the invention can be installed as a replacement of the prior art wiper blade without modification of the wiper arm or the connection to the wiper arm.

The wiper blade according to the invention can thus be sold by after market services as a separate part destined to replace the conventional wiper blade.

The invention is not limited to the embodiments which have been described.

Thus, several secondary yokes of the wiper blade according to the invention can have a branch which pivots in the manner described above for the secondary yoke located at the end of the blade.

The wiper blade of the invention can also have more than one intermediate yoke with a pivot in one of its branches.

It is to be understood that the location and number of such supplementary pivots will depend on the extent of and curvature of the glass to be wiped.

The wiper blade of the invention can have one or plural supplementary pivots on one or plural yokes as a function of the shape of the curve of the glass with which the blade is used, and will also work well on flat glass.

The invention can be used with glass wipers of all vehicles, such as an automotive vehicle.

I claim:

1. A glass wiper comprising a supple blade and a support assembly for the blade, said support assembly being adapted to be connected to a wiper arm and comprising, a carrier yoke having two branches, means for pivotally connecting at least one secondary blade holder yoke to each of the two branches of the carrier yoke, each secondary yoke having two branches connected to said supple blade, at least one branch of at least one of said secondary yokes having a first section and a second section located between the carrier yoke and the supple blade, means pivotally connecting said first and second sections together, said first section being pivotally connected to said carrier yoke, and elastic means for urging said first section toward the carrier yoke.

2. A glass wiper according to claim 1 wherein said carrier yoke is a main yoke, and the blade holder yoke is a secondary yoke.

3. A glass wiper according to claim 1 wherein the carrier yoke is an intermediate yoke and the blade holder yoke is a secondary yoke.

4. A glass wiper according to claim 1 wherein said one branch of the blade holder having first and second sections connected by the pivot means is located at the outer end of the wiper in a region of the wiper which engages a very curved portion of the glass during wiping of the glass.

5. A glass wiper according to claim 1 wherein said pivoted second section of the branch of the secondary yoke is located inwardly of the wiper relative to the first section.

6. A glass wiper according to claim 1 wherein said elastic means for urging said first section toward its carrier yoke comprises a U shaped spring engaged on opposed surfaces of facing portions of the branches of the carrier yoke and the holder yoke to urge the first section toward the carrier yoke.

7. A glass wiper according to claim 1 wherein said elastic means comprises an elastic band extending around said carrier yoke and the holder yoke to urge the first section of the holder yoke toward the carrier yoke.

8. A glass wiper according to claim 1 wherein said pivot means for pivotally connecting said first and second sections together comprises a hinge, and stop means for limiting the extent of pivoting of the ends of the branches of the blade holder yoke in a direction away from the surface of the glass which is wiped.

9. A glass wiper comprising a supple blade and a support assembly for the blade, said support assembly being adapted to be connected to a wiper arm and comprising, a main yoke having two branches, means for pivotally connecting an intermediate yoke to each branch of the main yoke, each intermediate yoke having two branches, means for pivotally connecting at least one secondary blade holder yoke to each of the two branches of each intermediate yoke, each secondary yoke having two branches connected to said supple blade, at least one branch of at least one of said secondary yokes having a first section and a second section located between the intermediate yoke and the supple blade, means for pivotally connecting said first and second sections together, said first section being pivotally connected to said intermediate yoke, and elastic means for urging said first section toward the main yoke.

10. A glass wiper according to claim 9 wherein at least one branch of said intermediate yoke comprises, a first section and a second section located between the main yoke and the secondary yoke, means for pivotally connecting said first and second sections together, said first section being pivotally connected to said main yoke, and elastic means for urging said first section toward the main yoke.

11. A glass wiper according to claim 10 wherein each said pivot means for pivotally connecting said first and second sections together comprises a hinge, and stop means for limiting the extent of pivoting of the ends of the branches of the yokes in a direction away from the surface of the glass which is wiped.

12. A glass wiper comprising a supple blade and a support assembly for the blade, said support assembly being adapted to be connected to a wiper arm and comprising, a main yoke having two branches, means for pivotally connecting an intermediate yoke to each branch of the main yoke, each intermediate yoke having two branches, means for pivotally connecting at least one secondary blade holder yoke to each of the two branches of each intermediate yoke, each secondary yoke having two branches connected to said supple blade, at least one branch of at least one of said intermediate yokes having a first section and a second section located between the main yoke and the secondary yoke, means for pivotally connecting said first and second sections together, said first section being pivotally connected to said main yoke, and elastic means for urging said first section toward the main yoke.

13. A glass wiper according to claim 12 wherein each of said branches of said secondary yokes is relatively rigid.

14. A glass wiper according to claim 12 wherein said pivot means for pivotally connecting said first and second sections together comprises a hinge, and stop means for limiting the extent of pivoting of the ends of the branches of the intermediate yoke in a direction away from the surface of the glass which is wiped.

* * * * *